No. 663,006. Patented Dec. 4, 1900.
G. BREED.
TRACK SUPPORTED SAILING DEVICE.
(Application filed Aug. 28, 1900.)

(No Model.) 2 Sheets—Sheet 1.

WITNESSES:
Henry Drury
Thomas S Gales

INVENTOR
George Breed
By
Charles N. Butler
Attorney

THE NORRIS PETERS CO., PHOTO-LITHO., WASHINGTON, D. C.

No. 663,006. Patented Dec. 4, 1900.
G. BREED.
TRACK SUPPORTED SAILING DEVICE.
(Application filed Aug. 28, 1900.)
(No Model.) 2 Sheets—Sheet 2.
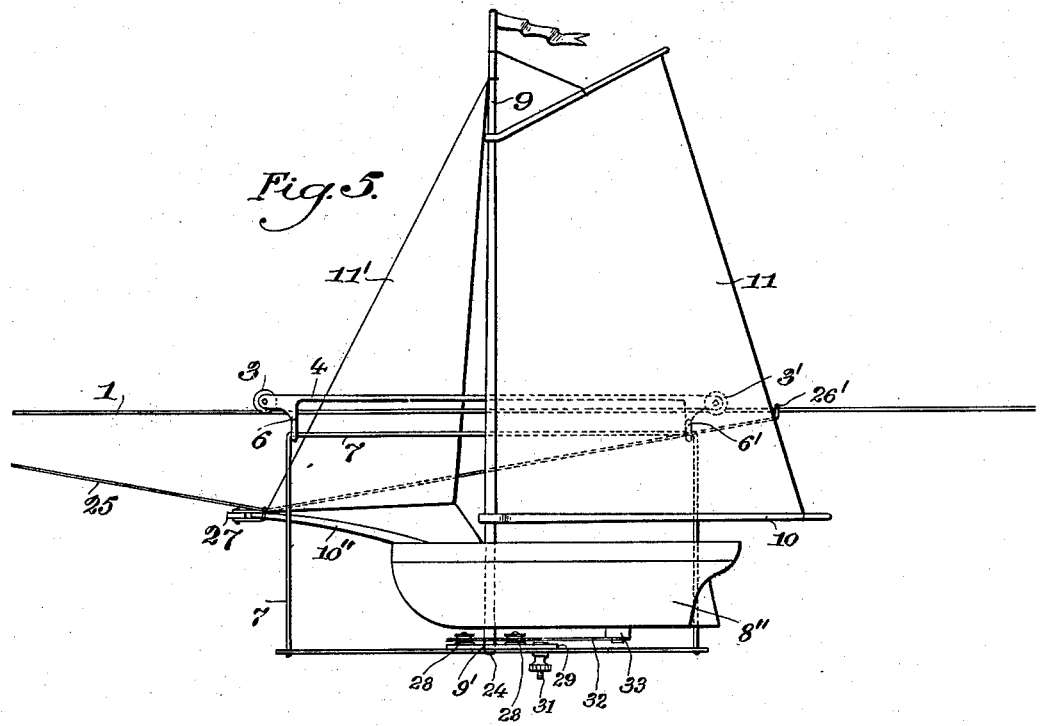
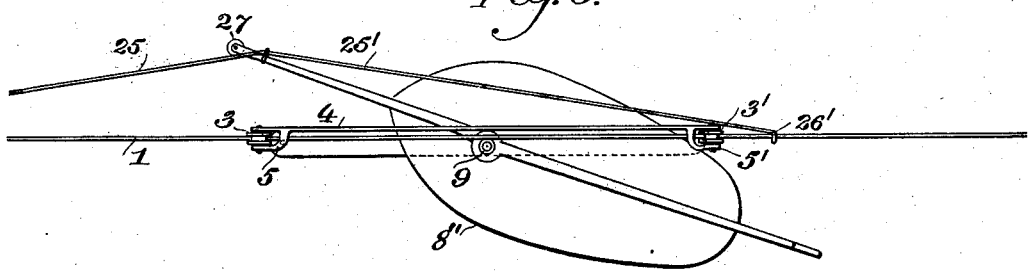
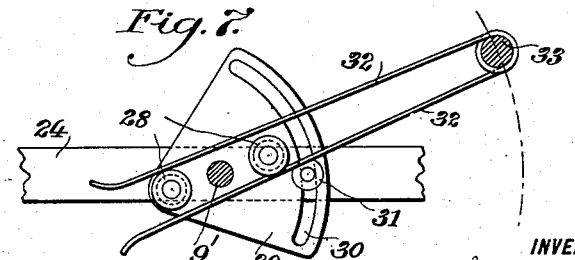
WITNESSES:
INVENTOR
George Breed
BY
Charles N. Butler
ATTORNEY.
THE NORRIS PETERS CO., PHOTO-LITHO., WASHINGTON, D. C.

UNITED STATES PATENT OFFICE.

GEORGE BREED, OF PHILADELPHIA, PENNSYLVANIA.

TRACK-SUPPORTED SAILING DEVICE.

SPECIFICATION forming part of Letters Patent No. 663,006, dated December 4, 1900.

Application filed August 28, 1900. Serial No. 28,326. (No model.)

*To all whom it may concern:*

Be it known that I, GEORGE BREED, a citizen of the United States, residing at Philadelphia, in the county of Philadelphia and State of Pennsylvania, have invented certain new and useful Improvements in Track-Supported Sailing Devices, of which the following is a specification.

This invention relates to mechanism for utilizing wind in transporting bodies supported by a track. The principle involved may be employed for amusement, advertising, or carrying purposes and may be applied to bodies of various forms adapted for carrying out said purposes whether movable on surface or elevated tracks.

Figure 1:
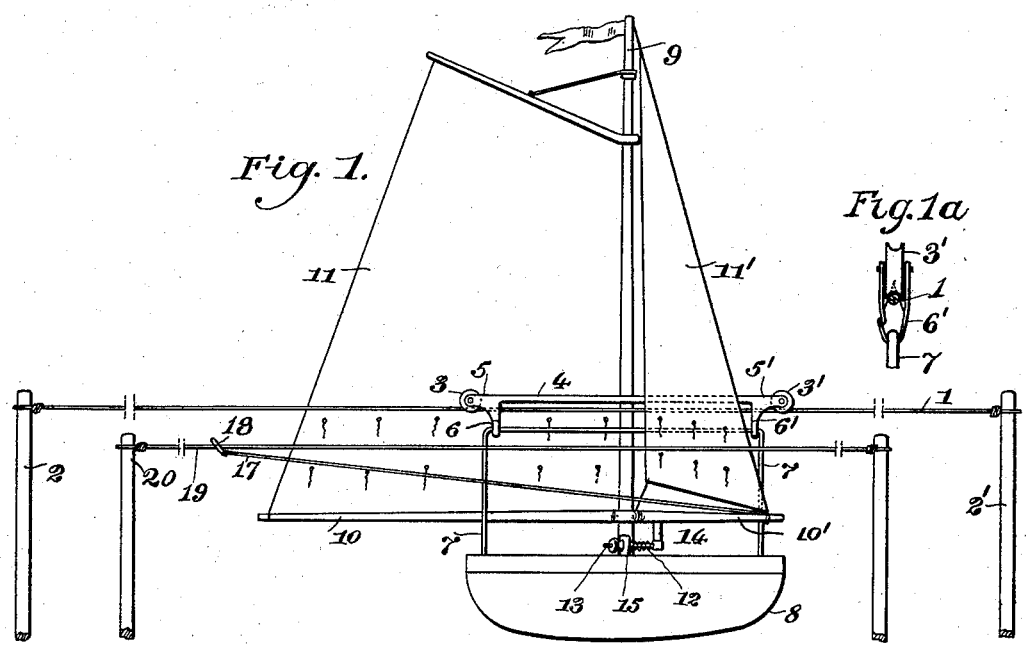
Figure 1A:
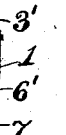
Figure 3:
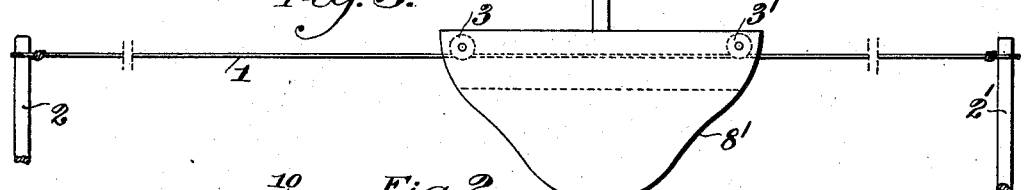
Figure 2:
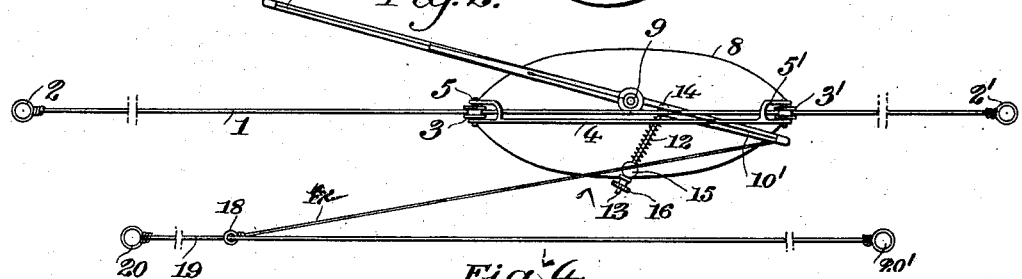
Figure 4:
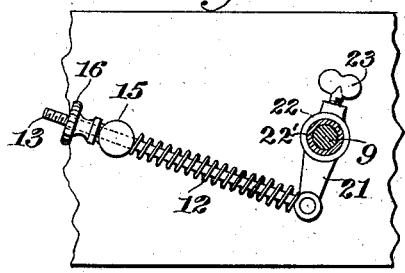

In the accompanying drawings, Figure 1 is a side elevation of a boat movably supported upon a track in illustration of my invention. Fig. 1ª is an end view of the truck for supporting and holding the boat on the track. Fig. 2 is a plan view of the mechanism illustrated in Fig. 1. Fig. 3 is a side elevation of a detail, showing a modification of the mechanism for supporting the boat upon the track and preventing it from capsizing. Fig. 4 is a plan view of a device for setting and holding the sails to the wind. Fig. 5 is a side elevation of a boat in illustration of an additional form of my invention. Fig. 6 is a plan view of the construction shown in Fig. 5, and Fig. 7 is a plan view of an additional form of device for setting and holding the sails to the wind.

As illustrated in the drawings, the track consists of a wire 1, drawn between two posts 2 and 2', the boat being movably supported upon this track by the wheels 3 and 3'. In the arrangement shown in Figs. 1, 2, 5, and 6 the wheels 3 and 3' are connected by a member 4, having bearings 5 and 5' for the wheels, forming a truck for supporting the mechanism carried by the track. Depending from the truck are the hooks 6 and 6', which encompass the wire 1 and prevent the wheels from leaving the track. These hooks engage a bail 7, which supports the boat, permitting the same to rock independently of the truck, so that the wheels may not be thrown from the track by the force of the wind, the bail supporting the boat so that the track is near the center of pressure, and capsizing is thus prevented. In the arrangement shown in Fig. 3 the wheels 3 and 3' are journaled in the upper part of the ballasted or weighted body or hull 8'.

In the form of the invention illustrated in Figs. 1 and 2 the bail 7 directly engages the body or hull 8. The mast 9, rising from the hull and preferably fixed with relation thereto, carries the booms 10 and 10' and the sails 11 and 11', which turn with relation to the track or course, so that the boat may tack, and thus sail back and forth. The sails are set and held to the wind by a coiled spring 12 and a rod 13, having one end connected to a pivot 14, secured to the boom 10', and the other end running through the stud or pivot 15, secured to the hull, a nut 16 on the end of the rod permitting the adjustment of the length thereof and the corresponding setting of the sails. When the boat has run to either end of the course, the sails are swung around on the other tack, the spring 12 being compressed and the rod 13 run through the stud 15 until the pivot or stud 14 has passed the dead-center, after which the sails are thrown around by the expansion of the spring. The sails may be swung around by attaching a line 17 to the end of the jib-boom 10' and manually hauling on it, or a ring 18 on the end of the line may run on a wire 19 and engage the respective stops 20 and 20' when the boat has run to either end of the course, thus mechanically hauling on the line and swinging the sails around on the other tack.

The mechanism for setting and holding the sails may be modified, as shown in Fig. 4, in which the rod 13 is pivoted to an arm 21, having a collar 22 and a set-screw 23 for adjusting the relation of the arm to the sleeve 22', preferably revoluble on the mast 9 and fixed to the revoluble booms 10 and 10'.

The boat may be supported and the hull swung around with the sails upon the reverse tack by the mechanism illustrated in Figs. 5 and 6, in which the load is carried by a seat or support 24, fixed to the bail 7. The hull 8'' is supported by an arbor 9', pivoted in the seat 24, the arbor being conveniently provided by extending the mast through the hull, and the mast, booms, and sails being fixed with relation to the hull. The hull and rigging may be brought around to the reverse tack by the mechanism previously described, or two rods 25 and 25' may be attached to the end of the jib-boom and their opposite ends, as 26', looped around the track-wire 1 on opposite sides of the boat, so that when the boat has run its course in either direction the end of the forward rod 25 or 25' will strike a stop or the support for the track, thus bringing the sails around by the thrust. It will be evident that the same result may be accomplished by providing the end of the boom with a roller 27 and permitting it to strike a fixed obstruction in its path.

An additional form of mechanism for setting and holding the sails to the wind is shown in Figs. 5 and 7, in which the spools or rollers 28 are secured to a sector 29, which is pivoted to the seat 24, as by the arbor 9', the position of the spools with respect to the seat and the track being made adjustable by means of the circular slot 30 in the sector and the clamp-bolt 31, passing therethrough and fixed to the seat 24. The springs 32, secured to the stud 33 on the hull, lie on opposite sides of the spools 28 and hold the boat to the wind in the position to which the spools may be set by adjusting the sector. When the boat is hauled around, the springs are spread until they have passed the dead-center or until they have passed the right-angle position with reference to the line of the spools, when they exert their force to swing the boat around on the other tack.

It will be evident that in the practice of my invention a body suitable for carrying purposes may be supported upon a track, whether elevated or not, and employed for pleasure or profit, and that various changes may be made in the details of construction herewith described, without departing from the spirit of my invention.

Having thus described my invention, I claim—

1. In a sailing device, a track, a movable body supported upon said track, a sail carried by said movable body, and mechanism for tacking said sail and changing the course of said movable body, substantially as specified.

2. In a sailing device, a track, a movable hull having wheels running upon said track, a sail carried by said movable hull, and mechanism for tacking said sail and changing the course of said movable hull, substantially as specified.

3. In a sailing device, a track, a movable body having wheels running upon said track, a sail carried by said movable body, and adjustable mechanism for setting and holding said sail to the wind on different tacks, substantially as specified.

4. In a sailing device, a track, a truck which runs upon said track, a hull or body carried by said truck along said track, a sail for moving said hull or body, and a device for holding the sail to the wind on different tacks, substantially as specified.

5. In a sailing device, a track, a truck which runs upon said track, a hull or body carried by said truck along said track, a sail for moving said hull or body, mechanism for preventing said hull and sail from capsizing, and a device for setting and holding said sail to the wind on different tacks, substantially as specified.

6. In combination, a track, a truck movable upon said track, a sailing device having a swiveled or rocking connection with said truck, and tacking mechanism which changes the course of said sailing device, substantially as specified.

7. In combination, a track, a sailing device movable upon said track, mechanism for setting and holding said sailing device to the wind on different tacks, and mechanism for bringing said sailing device about on the reverse tack, substantially as specified.

8. In combination, a track, a sailing device supported upon said track substantially on the line of mean wind pressure, and tacking mechanism for changing the course of said sailing device, substantially as specified.

9. In combination, a track, a sailing device movable upon said track, and a spring which holds said sailing device on different tacks while permitting it to be brought about, substantially as specified.

10. In a sailing device, a track, a movable body having wheels which run upon said track, a sail carried by said body for moving the same, a spring permitting said sail to be brought about and holding the same on different tacks, and mechanism for setting said sail to the wind, substantially as specified.

11. In combination, a pivoted adjustable support, a spool carried by said support and adjusted thereby, a spring having a fixed connection for supporting it and a movable connection or bearing upon said spool, said spool and spring being relatively movable, for the purpose set forth.

12. In combination, a suspended track, a truck movable upon said track, and a sailing device having a swiveled or rocking connection with said truck approximately on the line of mean wind pressure, substantially as specified.

In testimony whereof I affix my signature in presence of two witnesses.

GEORGE BREED.

Witnesses:
 THOMAS S. GATES,
 S. I. GILL.